(12) United States Patent
Fader

(10) Patent No.: US 8,394,189 B2
(45) Date of Patent: Mar. 12, 2013

(54) ASPHALT COMPOSITION USING PYROLYSED CARBONACEOUS MATERIAL

(76) Inventor: John H. Fader, West Bloomfield, MI (US)

( * ) Notice: Subject to any disclaimer, the term of this patent is extended or adjusted under 35 U.S.C. 154(b) by 355 days.

(21) Appl. No.: 12/734,537

(22) PCT Filed: Nov. 7, 2008

(86) PCT No.: PCT/US2008/012562
§ 371 (c)(1),
(2), (4) Date: May 7, 2010

(87) PCT Pub. No.: WO2009/061464
PCT Pub. Date: May 14, 2009

(65) Prior Publication Data
US 2010/0307380 A1 Dec. 9, 2010

Related U.S. Application Data

(60) Provisional application No. 60/986,126, filed on Nov. 7, 2007, provisional application No. 60/986,369, filed on Nov. 8, 2007, provisional application No. 60/986,318, filed on Nov. 8, 2007.

(51) Int. Cl.
*C08L 95/00* (2006.01)
(52) U.S. Cl. .................. 106/284.05; 106/281.1
(58) Field of Classification Search ........... 106/281.1, 106/284.05
See application file for complete search history.

(56) References Cited

U.S. PATENT DOCUMENTS

| | | | |
|---|---|---|---|
| 2,958,472 A | 11/1960 | Erickson et al. | |
| 3,769,257 A | 10/1973 | Gridley et al. | |
| 4,019,688 A * | 4/1977 | Akunov et al. | 241/39 |
| 4,221,608 A | 9/1980 | Beckman | |
| 5,037,628 A * | 8/1991 | Fader | 423/449.7 |
| 5,389,691 A | 2/1995 | Cha et al. | |
| 5,397,389 A * | 3/1995 | Glynn, Jr. | 106/281.1 |
| 5,853,687 A * | 12/1998 | Morlec et al. | 423/449.7 |

(Continued)

FOREIGN PATENT DOCUMENTS
DE 25 10 297 9/1976
EP 0 211 117 A2 2/1987
(Continued)

OTHER PUBLICATIONS

Heinisch, K.; "Kautschuk-Lexikon, 2. Auflage"; 1977, pp. 432-437; Genter Verlag; Stuttgart; XP002512108.

(Continued)

*Primary Examiner* — Helene Klemanski
(74) *Attorney, Agent, or Firm* — Warn Partners, P.C.

(57) ABSTRACT

The use of fine agglomerate mixtures and coarse agglomerate mixtures as an agglomerates filler materials in asphalt compositions. The fine agglomerate mixtures and coarse agglomerate mixtures are prepared from pyrolyzed polymeric and/or carbonaceous materials that have been refined into mixtures having consistent particle size and binding affinity with asphalt binders. An asphalt cement composition in accordance with one aspect of the present invention has an asphalt binder combined with an agglomerates filler formed from pyrolyzed carbonaceous material. The agglomerates filler material is generally about 1% to about 20% of the weight of the mixture of the agglomerates filler and the asphalt binder. The asphalt composition also includes an aggregate material that is mixed with the asphalt binder and the agglomerates filler. The end result is a lower cost asphalt composition that exhibits greater long range durability.

26 Claims, 14 Drawing Sheets

U.S. PATENT DOCUMENTS

| | | | |
|---|---|---|---|
| 6,391,274 B1 * | 5/2002 | Vogler et al. | 423/275 |
| 7,547,356 B2 * | 6/2009 | Partanen | 106/281.1 |
| 7,597,754 B2 * | 10/2009 | Argenio | 106/281.1 |
| 7,767,015 B2 * | 8/2010 | Hurtado Aznar et al. | 106/277 |
| 2002/0189494 A1 | 12/2002 | Jones, IV et al. | |
| 2005/0023124 A1 | 2/2005 | Karpetsky et al. | |
| 2005/0222317 A1 | 10/2005 | Yatsuyanagi et al. | |

FOREIGN PATENT DOCUMENTS

| | | |
|---|---|---|
| EP | 0 698 642 A1 | 2/1996 |
| EP | 1 548 509 | 6/2005 |
| GB | 659683 | 10/1951 |
| JP | 01 317555 A | 12/1989 |
| WO | WO 87/03220 | 6/1987 |
| WO | WO 00/14162 | 3/2000 |
| WO | WO 03/018855 A2 | 3/2003 |

OTHER PUBLICATIONS

"Rubber, Natural and Synthetic-General Test Methods; Carbon Black"; 1991 Annual Book of ASTM Standards, section 9; p. 317; Jan. 1, 1991; vol. 09.01; Philadelphia, Pennsylvania, USA.

Park, T. & Lovell, C.; "Using Pyrolized Carbon Black (PCB) from Waste Tires in Asphalt Pavement" Part 1, Limestone Aggregate from Civil Engineering Joint Transportation Research Program; Feb. 20, 1996; pp. 1-355; Purdue e-Pubs; http://docs.lib.purdue.edu/jtrp/222; West Lafayette, Indiana, USA.

Zeng, Y. & Lovell, C.; "Using Pyrolized Carbon Black (PCB) from Waste Tires in Asphalt Pavement" Part 2, Asphalt Binder from Civil Engineering Joint Transportation Research Program; Feb. 20, 1996; pp. 1-155; Purdue e-Pubs; http://docs.lib.purdue.edu/jtrp/223; West Lafayette, Indiana, USA.

* cited by examiner

US 8,394,189 B2

ASPHALT COMPOSITION USING PYROLYSED CARBONACEOUS MATERIAL

CROSS-REFERENCE TO RELATED APPLICATIONS

This application is a National Stage of International Application No. PCT/US2008/012562, filed Nov. 7, 2008. This application claims the benefit of the following applications:

U.S. Provisional Application No. 60/986,126, filed Nov. 7, 2007 entitled "Enhanced Fine Agglomerate Mixture".

U.S. Provisional Application No. 60/986,318 filed Nov. 8, 2007 entitled "Process Arrangement For Classifying Particles In A Pyrolysed Char".

U.S. Provisional Application No. 60/986,369 filed Nov. 8, 2007 entitled "Asphalt Composition Using Pyrolysed Carbonaceous Materials".

The disclosures of the above applications are incorporated herein by reference.

FIELD OF THE INVENTION

The present invention relates to a method of using pyrolyzed carbonaceous materials as a filler in an asphalt composition.

BACKGROUND OF THE INVENTION

The use of virgin carbon black has been widely studied by researchers as a performance-enhancing additive in asphalt pavement mixes. Using carbon black filler in asphalt compositions improves rutting resistance, reduces temperature susceptibility, reduces stripping potential, and improves wear resistance.

There have been many attempts to recycle tires and other rubber products to reclaim usable hydrocarbons through the use of a process called pyrolysis. Through pyrolysis, tires and other oil based compounds are processed to produce fuel and other hydrocarbon compounds. One particular byproduct resulting from the pyrolysis process is an ash or char material which is leftover after the process is complete. Attempts have been made to use this char as a low grade carbon black for use as a type of filler. However, this has been met with several disadvantages, most significantly the disadvantage of the impurities in the char resulting from the random distribution of particle size of the char as well as unwanted impurities such as ash. Additionally the surface chemistry of the particles has an effect on the ability of the carbon black material to be used as a filler material and some of the past attempts have yielded black carbon agglomerate particles having unfavorable surface chemistry. Thus there exists a need to provide reclaimed carbonaceous mixtures that are suitable for use as a high grade filler material comparable to virgin carbon black material.

SUMMARY OF THE INVENTION

The present invention is directed to the use of fine agglomerate mixtures and coarse agglomerate mixtures as agglomerates filler materials in asphalt compositions. The fine agglomerate mixtures and coarse agglomerate mixtures are prepared from pyrolyzed polymeric and/or carbonaceous materials that have been refined into mixtures having consistent particle size and binding affinity with asphalt binders. An asphalt cement composition in accordance with one aspect of the present invention has an asphalt binder combined with an agglomerates filler formed from pyrolized carbonaceous material. The agglomerates filler material is generally about 1% to about 20% of the weight of the mixture of the agglomerates filler and the asphalt binder. The asphalt composition also includes an aggregate material that is mixed with the asphalt binder and the agglomerates filler. The end result is a lower cost asphalt composition that exhibits greater long range durability.

The description of the invention is merely exemplary in nature and, thus, variations that do not depart from the gist of the invention are intended to be within the scope of the invention. Such variations are not to be regarded as a departure from the spirit and scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is directed to an asphalt cement composition formed using an agglomerates filler derived from pyrolyzed carbonaceous materials. The agglomerates filler when blended with an asphalt binder has properties that improve the durability of the asphalt composition.

In one embodiment of the invention an asphalt cement composition includes an asphalt binder, aggregate and agglomerates filler. The asphalt binder is any suitable binder used in making asphalt cement compositions. Two particular binders are AC-10 and AC-20 grade binders that are known in the art and are two of the most common binders used in the United States. Another binder PG 64-22 can also be used; however, it is within the scope of this invention to use virtually any type of asphalt binder which can vary from region to region.

The aggregate used also depends on the region and the types of aggregates available. Aggregates include but are not limited to sand, gravel, crushed stone, recycled concrete and asphalt, minerals, limestone, clay, and waste slag from steel furnaces. It is also within the scope of this invention to use virtually any type of aggregate depending on the types of aggregates available.

The agglomerates filler can be a coarse agglomerates mixture, fine agglomerates mixture or combinations thereof; which are obtained from an identification and separation apparatus 10 described below.

Figure 1:
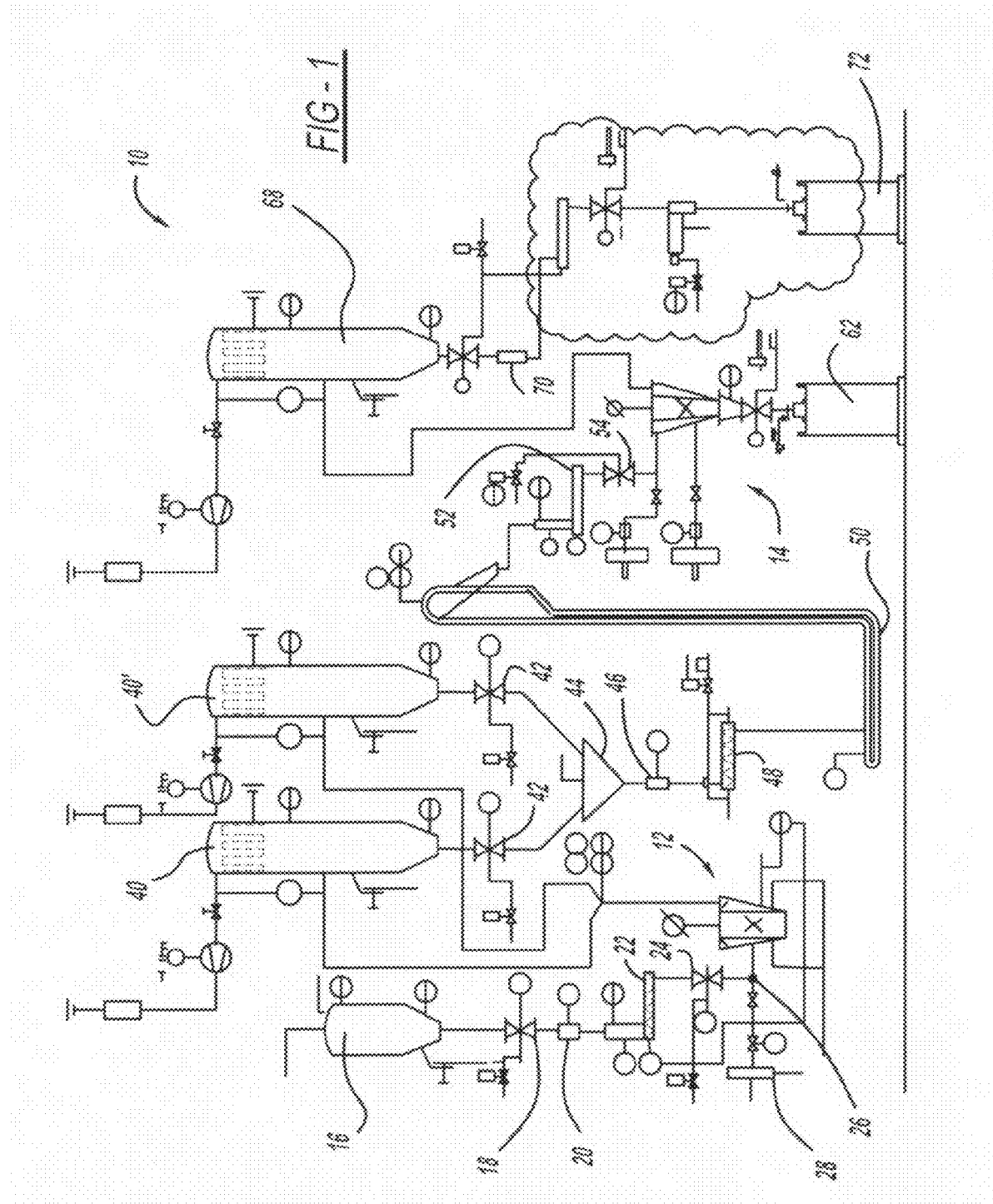
FIG. 1 is a prior art schematic view of a classification and identification apparatus.

The agglomerates filler is prepared from pyrolyzed polymeric and/or carbonaceous materials that have been treated using an identification and separation arrangement 10 in accordance with one aspect of the present invention. FIG. 1 depicts a schematic view of the identification and separation arrangement 10 in accordance with the present invention. Referring now to all of the figures and FIG. 1 in particular, the arrangement 10 includes a pulverizer mill 12 and a classifier 14. A hopper 16 serves as a source for the reclaimed carbonaceous materials to the arrangement 10. The hopper 16 is used to collect reclaimed carbonaceous materials prepared from the pyrolysis of recycled polymeric and/or carbonaceous materials, such as but not limited to scrap tires, polymeric and/or carbonaceous automotive components, Automotive Shredder Residue (ASR) used rubber materials, plastic containers, wood, leather, coal or the like. The reclaimed carbonaceous materials consist of large agglomerates, and small agglomerates of carbon black and other materials. While a collection hopper 16 is used to hold the reclaimed carbonaceous materials it is possible for the reclaimed carbonaceous materials to be fed directly into the arrangement 10 from a pyrolysis reactor (not shown) without first being collected in the hopper 16.

A valve 18 controls the flow of reclaimed carbonaceous materials from the hopper 16 to a magnet separator 20. The reclaimed carbonaceous materials sometimes have metal particles that were present in the recycled polymeric material prior to pyrolysis. These metal particles can harm the pulverizer mill 12 and the magnet separator 20 removes these unwanted metal particles. The use of the magnet separator 20 is not required and a greater or lesser number of magnet separators can be used.

After passing through the magnet separator 20 the reclaimed carbonaceous material is presented to a screw 22 that rotates and controls the flow of the material to the pulverizer mill 12. A valve 24 is used to turn on and off the flow of reclaimed carbonaceous material to a mixing node 26. At the mixing node 26 the reclaimed carbonaceous material is mixed with dry, filtered high pressure air generated from an air source 28. Together the mixture of dry pressurized air and reclaimed carbonaceous material are a feed that is introduced through a feed inlet 30 (see FIG. 2) of the pulverizer mill 12.

Figure 2:
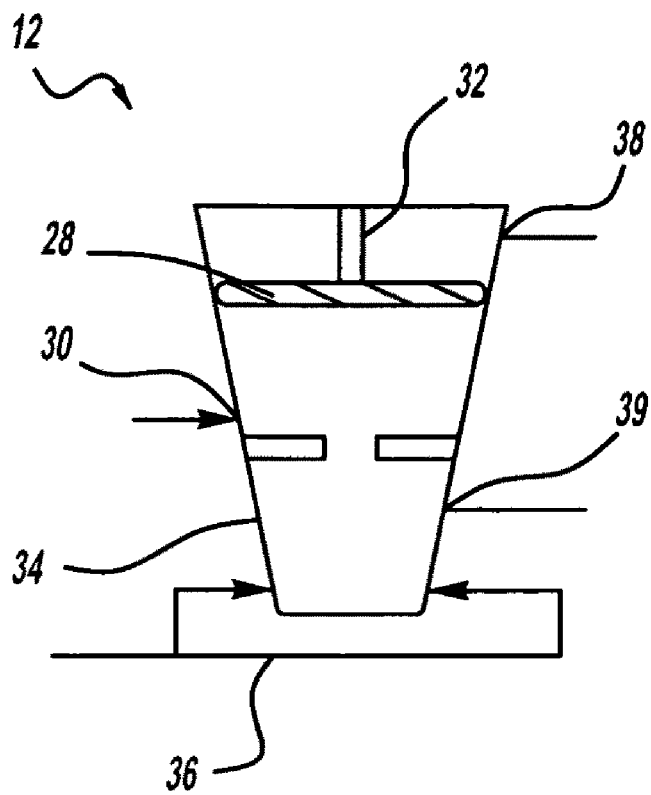
FIG. 2 is a plan schematic view of the pulverizer mill and the flow of carbon black through it in accordance with the present invention.

FIG. 2. depicts a schematic diagram of the pulverizer mill 12 which has a vortex column 28 where pressurized feed is introduced through the feed inlet 30 and swirls around the vortex column 28 causing the small agglomerates present in the feed to move to the top of the vortex column 28 while the larger agglomerates fall downward. While a single feed inlet 30 is described it is possible to have a greater number of feed inlets to adjust or enhance the swirling in the vortex column 28. A classifying disk 32 is present in the vortex column 28 and contributes to the swirling of the feed and prevents large agglomerates from moving past the classifying disk 22. The classifying disk 32 swirls the agglomerates and air in the vortex column 28 and uses specific gravity to separate the heavy dense agglomerates and particles from the lighter less dense agglomerates and particles. Thus the heavy dense agglomerates settle to the bottom of the vortex column 28, while the less dense agglomerates move to the top of the vortex column 28.

As the larger agglomerates move to the bottom of the vortex, they enter a fractionation chamber 34 of the pulverizer mill 12. At least two opposing air inlets 36 are present in the fractionation chamber 34 for blowing the large agglomerate particles at opposite sides of the chamber toward each other. While two opposing air inlets 36 are discussed it is possible to have a greater or lesser number of opposing air inlets 36. The large agglomerate particles are accelerated toward each other, collide and are fractionated into smaller agglomerates. The smaller agglomerates are reintroduced into the vortex column 28 where they go past the classification disk 32 if their density is low enough, and then travel out of a small agglomerates port 38. The larger agglomerates that do not get fractionated exit a chamber outlet 38 and are collected. Optionally the large agglomerates that leave via the chamber outlet 38 can be reintroduced to the reclaimed carbonaceous material at the valve 24.

The small agglomerates that pass through the small agglomerates port 38 flow on to one of two filter hoppers 40, 40'. The filter hoppers contain a polymer surface area filter that collects the small agglomerates which have tendency to become airborne after leaving the vortex column 28. The present invention describes using two filter hoppers for collecting the small agglomerates, however, it is within the scope of this invention for a greater or lesser number of filter hoppers to be used depending upon the rate of production from the pulverizer mill 12. Valves 42, 42' control the flow of small agglomerates from the filter hoppers 40, 40' onto a small agglomerate supply hopper 44 that is used to supply small agglomerates to the classifier 14. While FIG. 1 depicts multiple valves 42, 42' associated the filter hoppers 40, 40' it is possible to have a greater or lesser number of valves. After leaving the small agglomerate supply hopper 44 the small agglomerates are optionally passed through a second magnet filter 46 to further remove any metallic impurities present. A feed screw 48 receives the small agglomerates and controls the flow of small agglomerates supplied to a conveyor 50 that moves the small agglomerates to another feed screw 52 and valve 54 that control the flow of the small agglomerates to the classifier 14. It is with the scope of this invention to have the feed screw 48 flow directly to the classifier 14, however, it is preferable to use multiple feed screws and the conveyor because of the physical size of the components in the identification and separation arrangement 10 requires moving the small agglomerates a distance between components.

Figure 3:
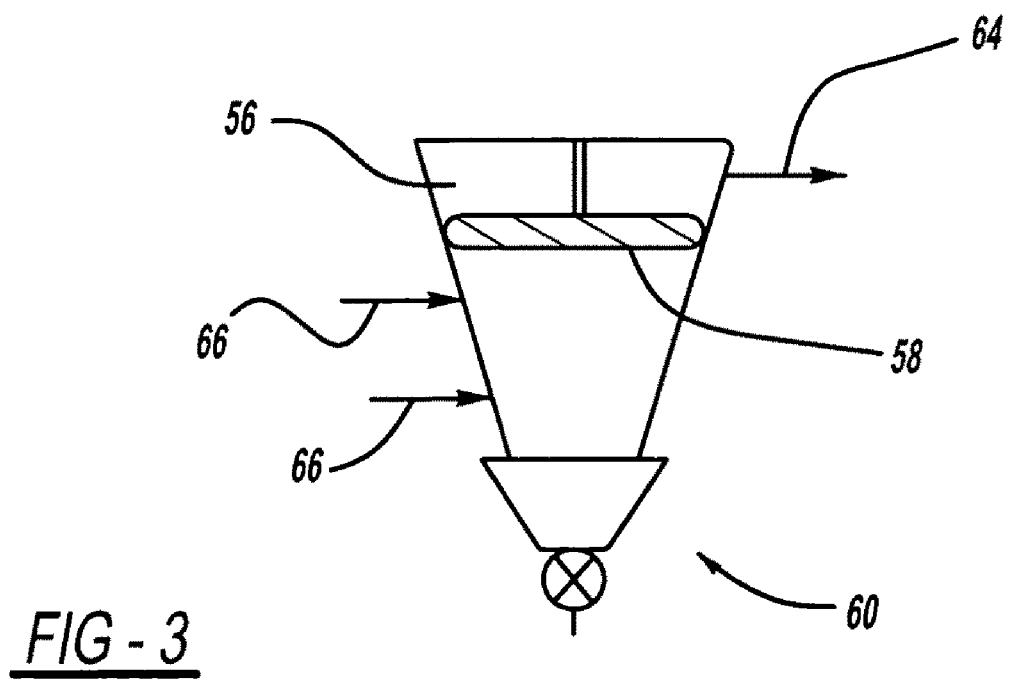
FIG. 3 is a plan schematic view of the classifier in accordance with the present invention.

Referring now to FIGS. 1 and 3 the small agglomerates enter the classifier 14 through the one of two high pressure inlets 66. The small agglomerates are mixed with dry pressurized air, fed through one of the two inlets 66 and are swirled in a vortex column 56 of the classifier 14 where the small agglomerates are separated into a coarse agglomerates mixture and a fine agglomerates mixture. Some of the small agglomerates are made of coarse agglomerates with fine agglomerates stuck to the coarse agglomerates. The swirling of the small agglomerates causes the fine agglomerates which have a low density and are sized in the nanometer range to separate from the coarse agglomerate particles which are much more dense and are measured in microns. The swirling action in the vortex column 56 is caused by the air pressure flowing through the high pressure inlets 66 and a rotary classification wheel 58 which causes the fine agglomerates which are less dense and have a smaller particle size to move to the top of the vortex column 56. The coarse agglomerates which are more dense and generally larger in size than the small agglomerates move to the bottom of the vortex column. It is within the scope of this invention to have a greater or lesser number of air inlets 66 as well as having the small agglomerates enter the vortex column 56 through more than one of the high pressure inlets 66.

The rotary classification wheel 58 functions in the same way as the classification disk 32 of the pulverizer mill 12 by only allowing agglomerates of a certain size and density to pass out of the vortex column 58 through a fine agglomerates outlet 64. The coarse agglomerates settle to the bottom of the vortex column 56 and are collected in a container 62 for use as a filler in processes where coarse agglomerates are acceptable. The fine agglomerates that pass through the fine agglomerates outlet 64 flow to a filter hopper 68 containing a polymeric surface area filter that collects the fine agglomerates. This step is necessary because the fine agglomerates are so small in size that they become easily airborne. After passing through the filter hopper 68 the fine agglomerates are then optionally passed through a magnet separator 70 to remove any metallic impurities that might be present and then the fine agglomerates are moved to a holding area 72 where they form a fine agglomerates mixture that is stored in a container, pelletizer, bag or blended with an elastomer to prevent the fine agglomerates from becoming airborne.

The coarse agglomerates and fine agglomerates individually or when blended together are high in carbon and create an agglomerates filler that is suitable to use in an asphalt cement composition in accordance with the present invention.

The coarse agglomerates removed from the identification and classification apparatus have an agglomerate size that measures generally about 8 microns to about 70 microns; typically about 15 microns to about 45 microns; preferably about 20 microns to about 28 microns. The fine agglomerates mixture in the holding area 72 are clusters of particles that include carbon black particles. The fine agglomerates mixture is formed from the pyrolysis of polymeric materials such as tires, polymeric automotive components, recyclable polymeric components such as milk cartons and other containers, asphalt or any other suitable source of polymeric material that will yield fine agglomerates suitable for use as fillers in rubber compounding processes. The fine agglomerates mixture and coarse agglomerates mixture include a carbon content of generally about 80% to about 95%; typically about 85% to about 90%, preferably about 89% to about 91%, and about 90% by weight of the mixture in a preferred embodiment of the invention.

The coarse agglomerates generally has an agglomerate diameter-size in the range of about 8 microns to about 70 microns, typically about 15 microns to about 45 microns, preferably about 20 microns to about 28 microns and in a preferred embodiment the size will be about 26 microns.

The average agglomerate size of the fine agglomerates mixture is less than or equal to 4 microns and are formed from clusters of fine agglomerate particles averaging less than or equal to 35 nm when dispersed in an aqueous solution and measured using electron microscopy. The size of the fine agglomerate particles is important from the standpoint that the smaller the agglomerate size the better they are for use as a high grade filler comparable to a N500 to N600 grade virgin carbon blacks.

The nitrogen surface area of the fine agglomerates mixture is another important factor in determining whether a filler material will be suitable as a high grade filler material. The nitrogen surface area is indicative of the binding affinity the filler material has when used in rubber compounding. The fine agglomerates mixture of the present invention generally has nitrogen surface areas that area measured using two different techniques, the BET technique and the Iodine absorption technique. The fine agglomerates mixture has a nitrogen surface area determined using the BET technique of generally about 46 $m^2/g$ to about 72 $m^2/g$ and preferably about 58 $m^2/g$. The fine agglomerates mixture has a nitrogen surface area determined using the iodine absorption technique of about 53 $mgI_2/g$ to about 254 $mgI_2/g$ and preferably about 176 $mgI_2/g$.

The fine agglomerates mixture also has pyrolyzed carbon black particles and an inorganic functional filler material which after treatment by the separation and identification apparatus allows for the fine agglomerates mixture to function like a commercial carbon black having an N500 to N600 rating. The inorganic functional filler can be one selected from the following group; silica, alumina, titania, iron oxide, calcium oxide, magnesium or combinations thereof. It is also possible for other inorganic filler materials to be used provided that they allow for the fine agglomerates mixture to function like a desired grade of virgin carbon black.

Where the agglomerates filler which includes the fine agglomerates mixture, coarse agglomerates mixture or combinations thereof include a Carbon content of generally about 80% to about 95%; typically about 85% to about 91%, preferably about 89% to about 91%; and in a preferred embodiment about 90% by weight. The agglomerates filler also has functional inorganic fillers that are generally about 5% to about 20%; and typically about 8% to about 15%, preferably about 9% to about 11%, and in a preferred embodiment about 10% by weight of the agglomerates filler. The functional inorganic fillers are minerals that include but are not limited to Silica ($SiO_2$), Alumina ($Al_2O_3$), Titania ($TiO_2$), Iron Oxide ($Fe_2O_3$), Calcium Oxide (CaO), Magnesium Oxide (MgO).

The agglomerates filler makes up generally 1% to about 20%, typically 5% to about 15%, preferably 4% to about 12% and in a preferred amount of 8% all measured by the weight of the asphalt binder mixed with the agglomerates filler. The mixture of the agglomerates filler and the asphalt binder is applied to the aggregate to make the asphalt composition in accordance with one embodiment of the present invention. When the asphalt cement composition has been formed and tested, the results show that there is improved rut resistance, less possibility of stripping, sound absorption, greater heat dissipation and more resistance to stripping. Overall the asphalt cement composition is a lower cost composition that exhibits superior properties.

In further regard to the agglomerates filler, and in particular the fine agglomerate mixture, an analysis of the material was conducted that compared the fine agglomerate mixture to other carbon black containing mixtures produced through the pyrolysis of materials. Table 1 outlined below shows an analysis of the carbon and ash content of each of the mixtures analyzed. The samples labeled 070614, 23615, 09620B, 09629M were obtained from CPH company and were produced using ambient pressure pyrolysis and then the material was treated by airwaves in the same conditions. The sample labeled CBp was a fine agglomerates mixture prepared in accordance with one embodiment of the present invention. The sample labeled CBP0 was a mixture of material coming from Pyrovac Company Canada, and was obtained by reduced pressure pyrolysis. The samples labeled KHC2 and KHKC1 were samples from the KHC Company (Taiwan) and were obtained by reduced pressure pyrolysis (KHC2) and also after a clarification from the mineral impurities by washing with acid solution (KHC1).

TABLE 1

CARBON AND ASH CONTENT OF THE CARBON PRODUCTS

| Carbon Product | % C | Ash % |
| --- | --- | --- |
| 070614 | 80.41 | 19.5 |
| 023615 | 84.2 | 13 |
| 026202B | 78.52 | 17.5 |
| 026220M | 76.2 | 16 |
| CBp | 82 | 14.3 |
| CBp0 | 82.8 | 12.4 |
| KHC1 | 88.4 | 6.26 |
| KHC2 | 83.5 | 11.7 |

The CBp sample had a relatively high carbon content with a lower ash content when compared to several of the samples under study. The KHC1 sample had a lower ash content which was determined to be a result of a washing process that took place after pyrolysis. The washing process can remove some of the ash; however, it can have an undesirable affect on nitrogen surface area as discussed below.

For creating suitable fillers equivalent to virgin carbon blacks there are two characteristics, particle size and nitrogen surface area. Table 2 sets forth the nitrogen surface area data that was obtained from the samples analyzed. The nitrogen surface area was determined using two different techniques, the BET technique and the iodine absorption technique.

TABLE 2

| Carbon Product | $N_2SA$ BET ($m^2/g$) | $n°I_2$ ($mgI_2/g$) |
| --- | --- | --- |
| 070614 | 79 | 235 |
| 023615 | 81 | 247 |
| 026202B | 75 | 253 |
| 026220M | 42 | 226 |
| CBP0 | 73 | 255 |
| CBP | 58 | 176 |
| KHC1 | 45 | 52 |
| KHC2 | n.d. | 43 |

In particular it was found that the CBP material had good nitrogen surface area values when considering the average agglomerate particle size. The 070614, 023615, 026202B and 026220M and CBP0 samples all had higher nitrogen surface area values compared to the CBP sample, however, as we will see below these samples also had a much larger agglomerate size which is an undesirable characteristic.

With regard to particle size of the individual samples, Table 3 outlined below sets forth the average agglomerate particle size found for the samples under study. The particle size is referring to the size or average diameter of the particles forming the agglomerates when the agglomerates are dispersed in an aqueous solution.

TABLE 3

| Carbon Product | Particle Size (nm) |
| --- | --- |
| 070614 | 43 |
| 023615 | 36 |
| 026202B | 52 |
| 026220M | 59 |
| CBP0 | 40 |
| CBP | 27 |
| KHC1 | 47 |
| KHC2 | 48 |

The CBP sample, in accordance with this invention, had the smallest average particle size out of the samples tested.

Figure 4A:
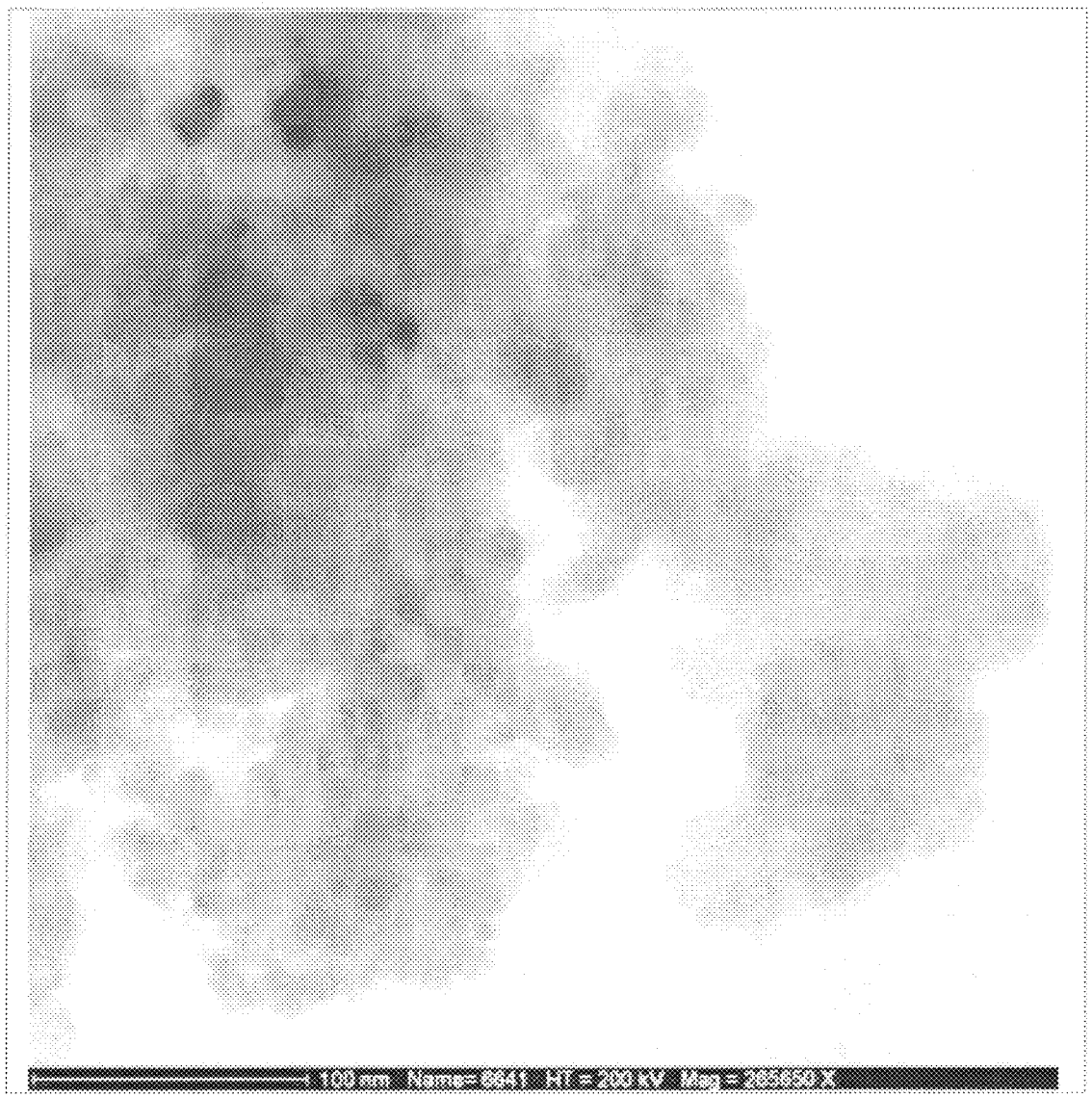
FIG. 4*a* is a microphotograph of the fine agglomerates mixture dispersed in an aqueous solution and magnified 265,650 times in accordance with the teachings of the present invention.
Figure 4B:
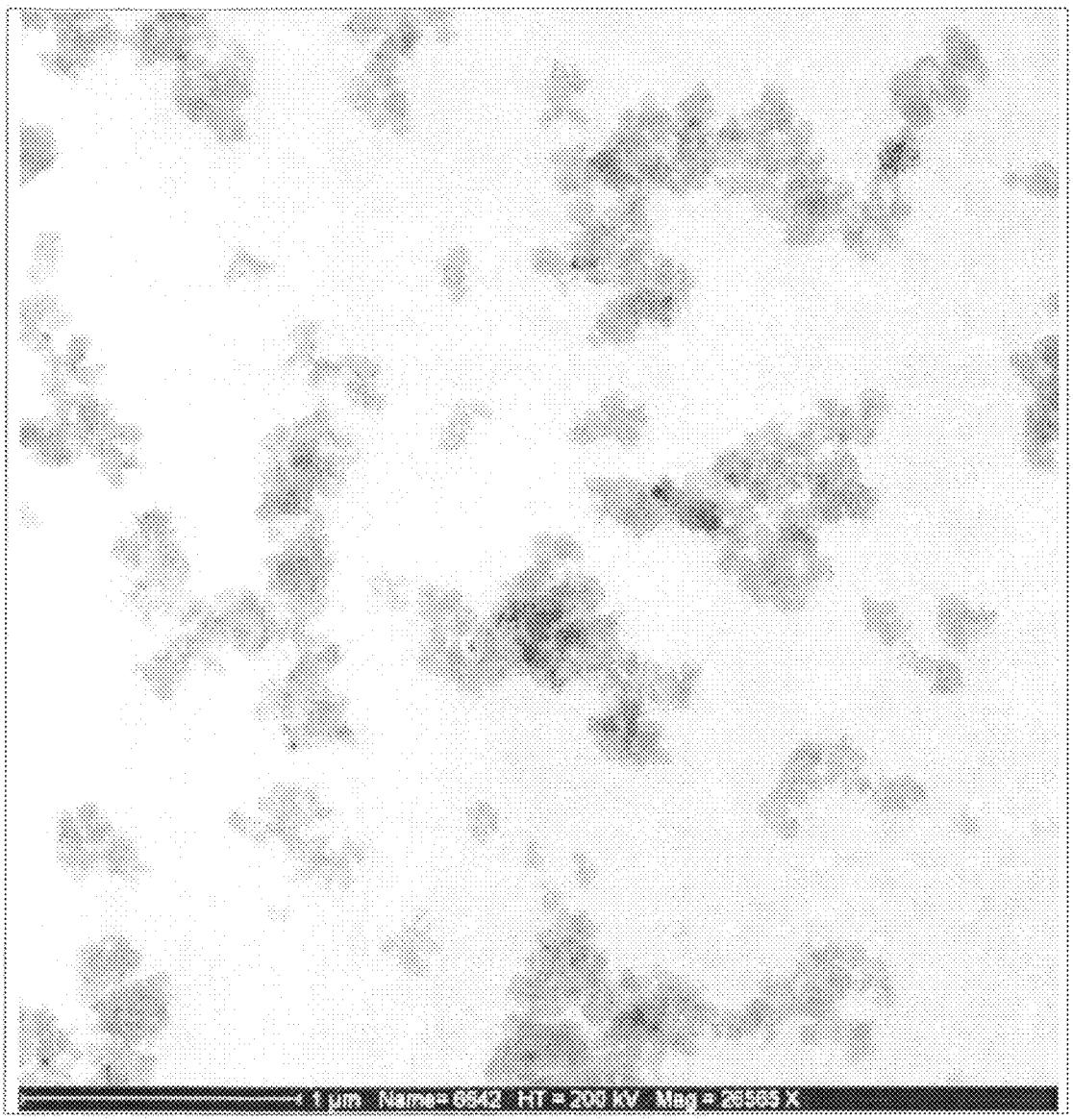
FIG. 4*b* is a microphotograph of the fine agglomerates mixture dispersed in an aqueous solution and magnified 26,565 times in accordance with the teachings of the present invention.
Figure 5A:
FIG. 5*a* is a microphotograph of the KHC1 aggregate dispersed in an aqueous solution and magnified 265,650 times.
Figure 5B:
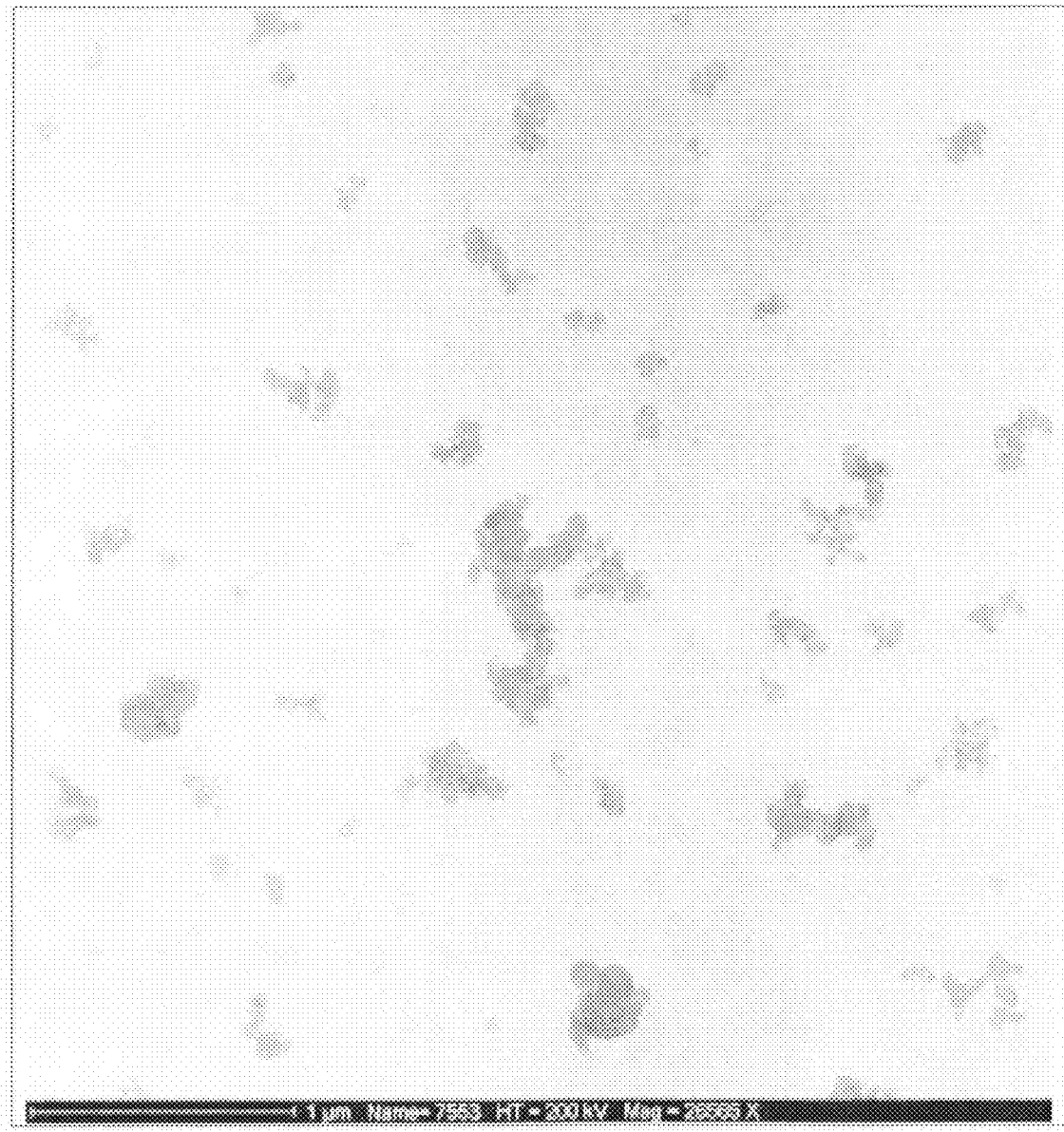
FIG. 5*b* is a microphotograph of the KHC1 aggregate dispersed in an aqueous solution and magnified 26,565 times.

FIG. 4a is a microphotograph of the CBP fine agglomerates mixture magnified 285,650 times, while FIG. 4b is the same aggregate magnified 28,650 times. FIG. 5a and FIG. 5b are microphotographs of the KHC1 aggregate magnified 285,650 times and 28,650 times respectively. An analysis of such microphotographs shows lighter, fuzzier agglomerates in the CBp sample. The KHC1 agglomerates show darker agglomerates with more solid shape which indicates that they are denser than the CBp agglomerates. This suggests that the bonding surface areas of these agglomerates are not as great. Microphotographs of the other samples could not be obtained.

Figure 6A:
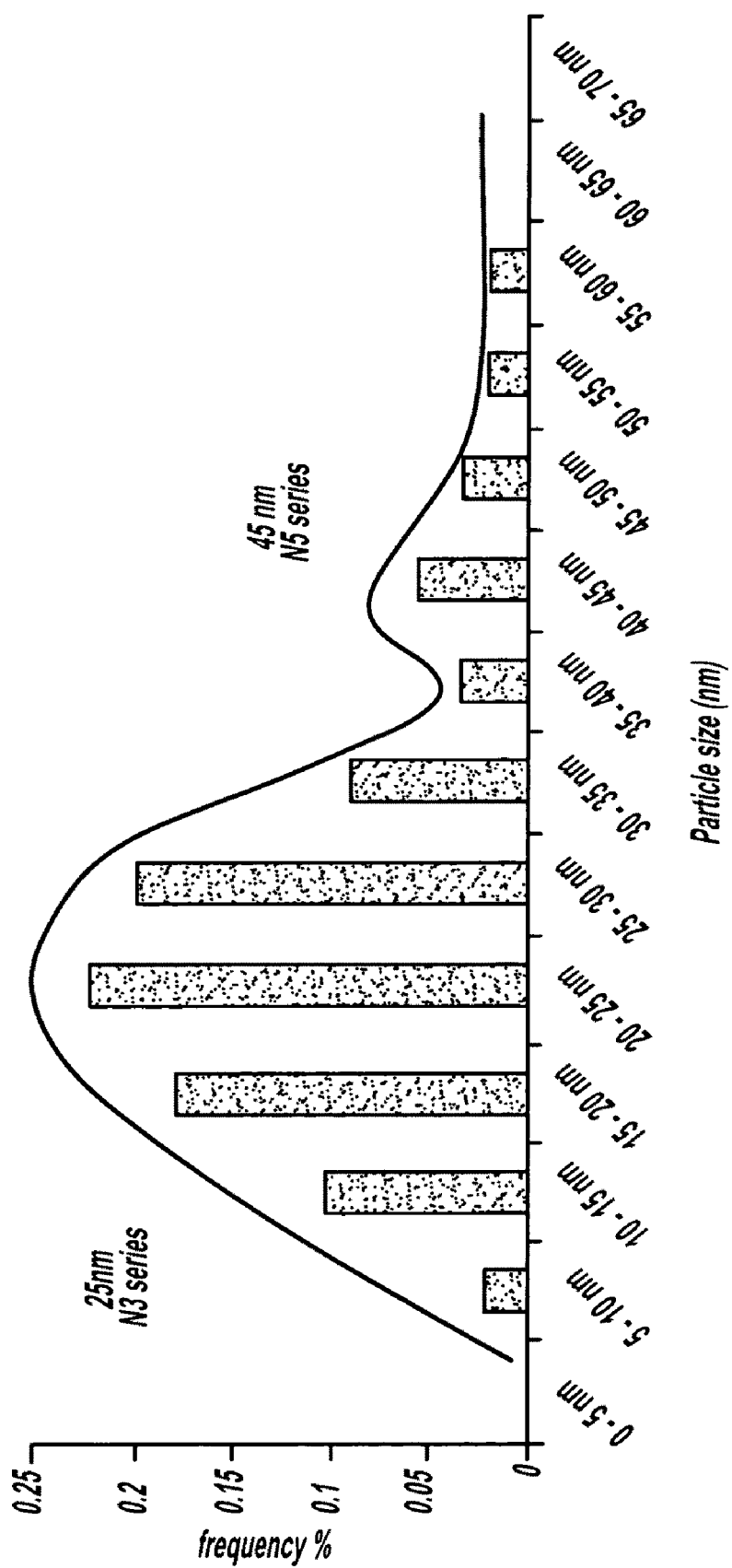
FIG. 6*a* is a graph illustrating the particle size distribution of the fine agglomerates mixture in accordance with the teachings of the present invention.
Figure 6B:
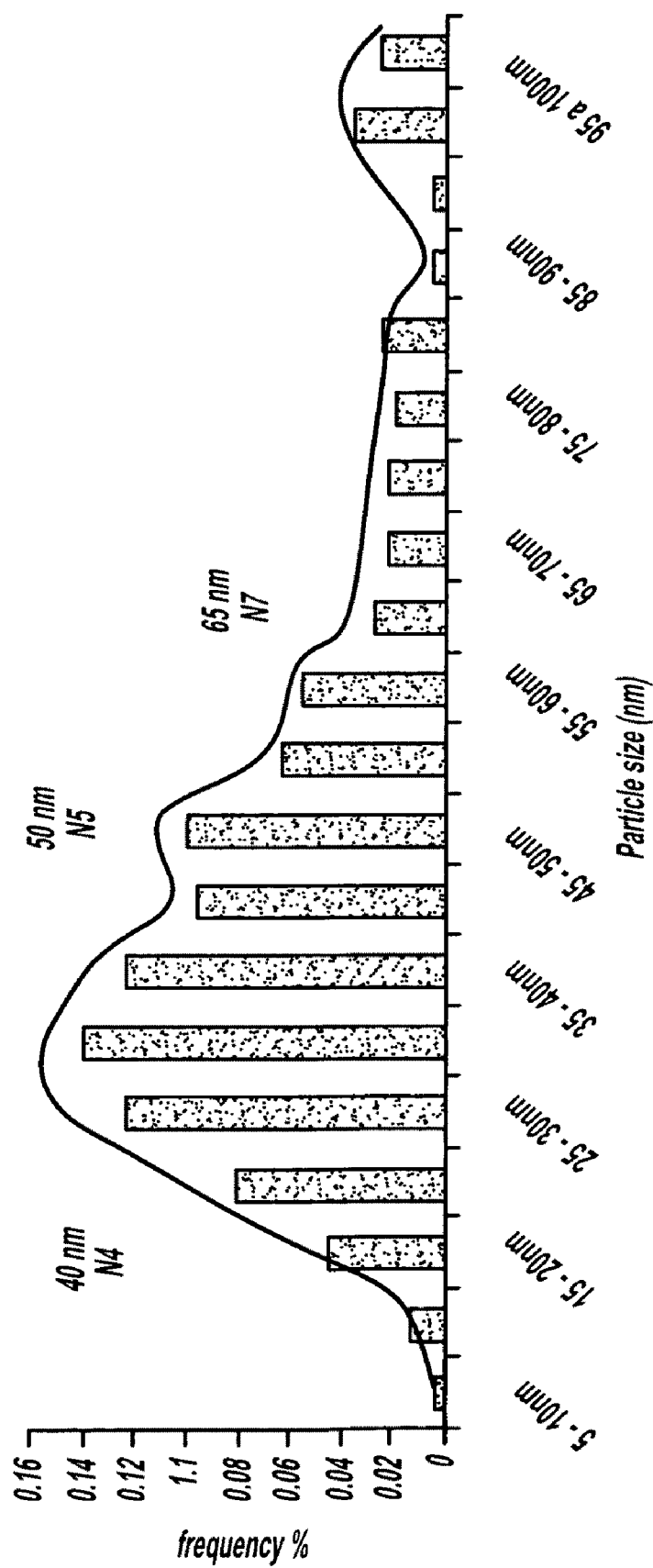
FIG. 6*b* is a graph illustrating the particle size distribution of the KHC1 sample.
Figure 6C:
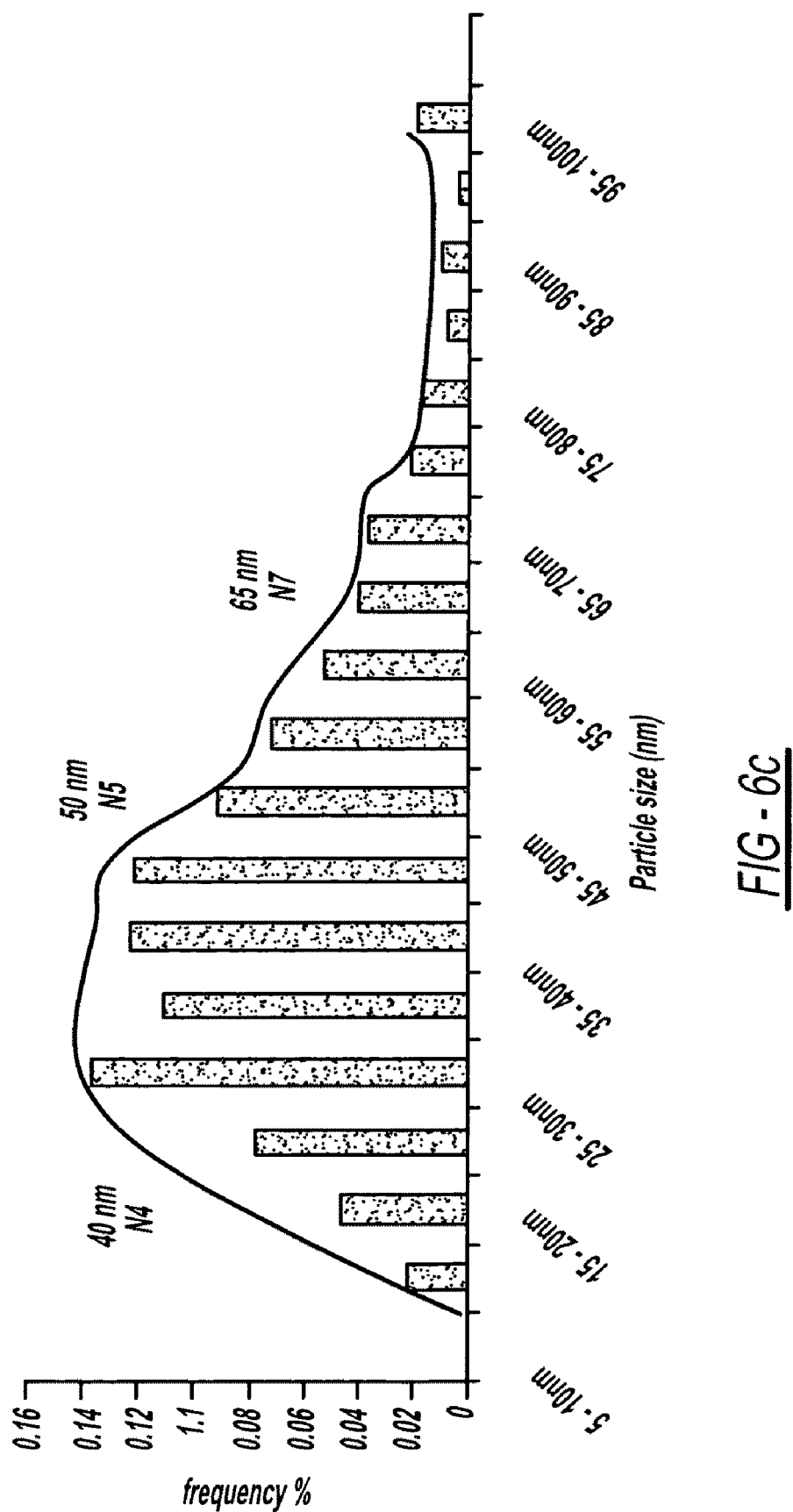
FIG. 6*c* is a graph illustrating the particle size distribution of the KHC2 sample.
Figure 6D:
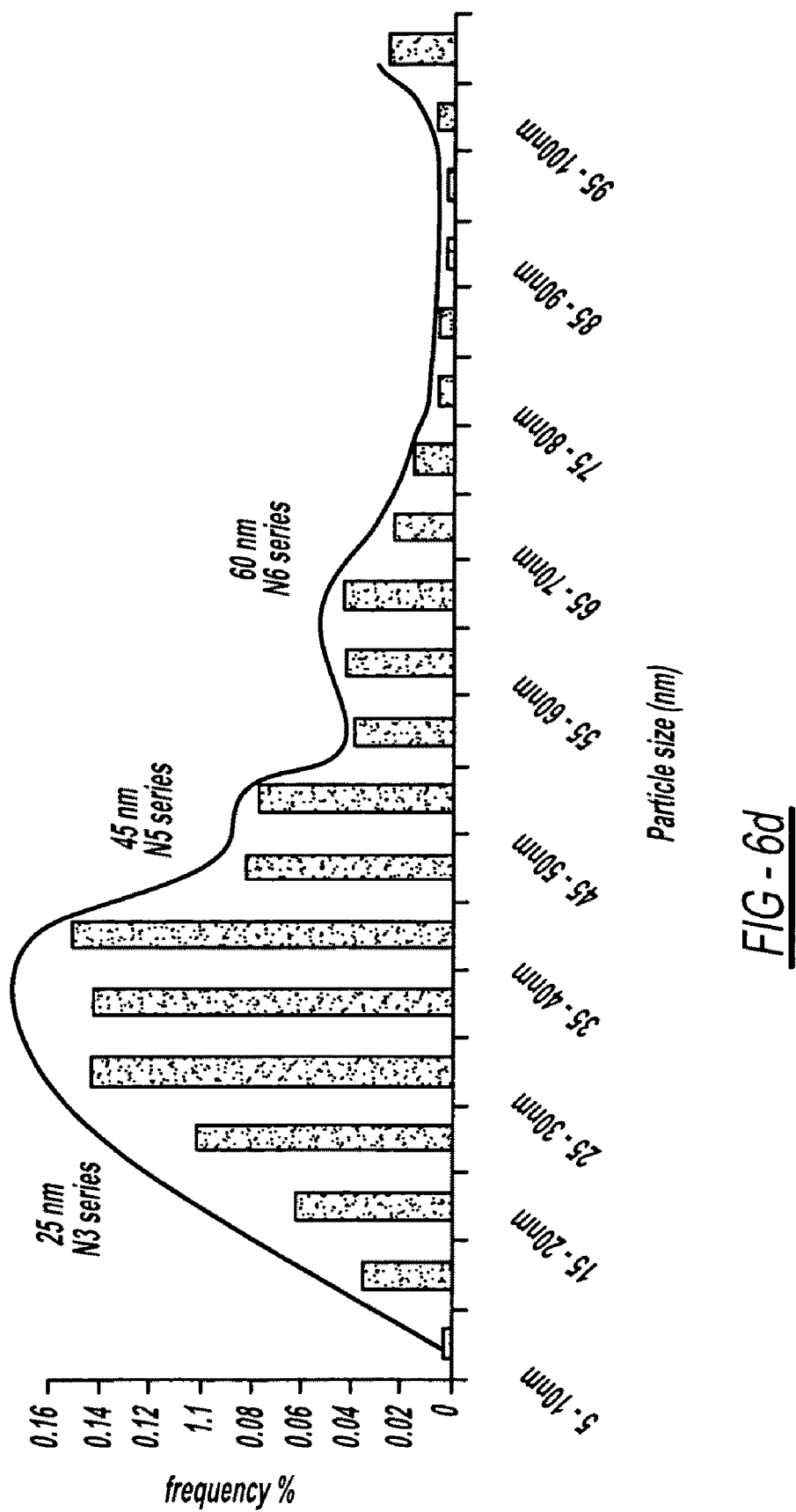
FIG. 6*d* is a graph illustrating the particle size distribution of the CBp0 sample.

FIGS. 6a-6d are graphs illustrating the particle size distribution of the CBP, KHC1, KHC2, and CBP0 samples that were tested. FIG. 6a shows that the CBP sample has a particle or agglomerate size distribution that centers between 22-25 nm with the distribution of particles varying from that point. FIG. 6b is a graph of the particle size distribution data for the KHC1 sample. This data shows a much wider particle size distribution that ranges from 25-30 nm to 40-50 nm. FIG. 6c is a graph of the particle size distribution for the KHC2 sample, which shows a much wider dispersion of particles with the highest frequencies between 40 nm all the way up to 65 nm. FIG. 6d is a graph showing the particle size distribution of the CBP0 sample which has a much lower frequency of particles between 25-45 nm range than compared to the CBP mixture prepared in accordance with the present invention. Also, the CBP0 sample has a higher frequency of particles in the 45-60 nm range. Overall the particle size dispersion shown in FIGS. 6a-6d illustrates that the CBP sample has a much higher frequency in consistency of particles when compared to the other samples tested.

Example 1

An asphalt cement composition is formed having an asphalt binder, agglomerates filler formed from pyrolized carbonaceous material and an aggregate material.

The asphalt binder is mixed with the agglomerates filler prior to being mixed with the aggregate material. The asphalt binder in one mixture is an AC-10 grade binder, in another mixture is an AC-20 grade binder and in another mixture a PG 64-22 grade binder. In each of the above three mixtures the agglomerates filler is mixed. The mixture of agglomerates fillers of 1%, 4%, 5%, 8%, 12%, 15%, 20% are blended by the weight of the asphalt binder mixed with the agglomerates filler. The agglomerates filler has a Carbon content of generally about 80% to about 95%; typically about 85% to about 91%, preferably about 89% to about 91%; and in a preferred embodiment about 90% by weight. The agglomerates filler also has functional inorganic fillers that are generally about 5% to about 20%; and typically about 8% to about 15%, preferably about 9% to about 11%, and in a preferred embodiment about 10% by weight of the agglomerates filler.

The above three mixtures are then mixed with an aggregate material to form an asphalt cement composition. One asphalt cement composition formed has the AC-10 binder with the agglomerates filler and limestone aggregate. Another asphalt cement composition has AC-20 binder with agglomerates filler and limestone aggregate. Another asphalt cement composition has PG 64-22 binder, agglomerates filler and limestone. Another asphalt cement composition formed has the AC-10 binder with the agglomerates filler and sand aggregate. Another asphalt cement composition has AC-20 binder with agglomerates filler and sand aggregate. Another asphalt cement composition has PG 64-22 binder, agglomerates filler and sand aggregate. Another asphalt cement composition formed has the AC-10 binder with the agglomerates filler and gravel aggregate. Another asphalt cement composition has AC-20 binder with agglomerates filler and gravel aggregate. Another asphalt cement composition has PG 64-22 binder, agglomerates filler and gravel aggregate. Another asphalt cement composition formed has the AC-10 binder with the agglomerates filler and crushed stone aggregate. Another asphalt cement composition has AC-20 binder with agglomerates filler and crushed stone aggregate. Another asphalt cement composition has PG 64-22 binder, agglomerates filler and crushed stone aggregate. Another asphalt cement composition formed has the AC-10 binder with the agglomerates filler and slag aggregate. Another asphalt cement composition has AC-20 binder with agglomerates filler and slag aggregate. Another asphalt cement composition has PG 64-22 binder, agglomerates filler and slag aggregate. Another asphalt cement composition formed has the AC-10 binder with the agglomerates filler and recycled concrete aggregate. Another asphalt cement composition has AC-20 binder with agglomerates filler and recycled concrete aggregate. Another asphalt cement composition has PG 64-22 binder, agglomerates filler and recycled concrete aggregate. Another asphalt cement composition formed has the AC-10 binder with the agglomerates filler and mineral aggregate. Another asphalt cement composition has AC-20 binder with agglomerates filler and mineral aggregate. Another asphalt cement composition has PG 64-22 binder, agglomerates filler and mineral aggregate. Another asphalt cement composition formed has the AC-10 binder with the agglomerates filler and clay aggregate. Another asphalt cement composition has AC-20 binder with agglomerates filler and clay aggregate. Another asphalt cement composition has PG 64-22 binder, agglomerates filler and clay aggregate.

In all of the above asphalt cement compositions three asphalt cement compositions are made from each where one asphalt cement composition has an agglomerates filler that is made from a fine agglomerates mixture, a second asphalt cement composition has an agglomerates filler that is a coarse agglomerates mixture and a third asphalt composition that has a combination of a fine agglomerates mixture and a coarse agglomerates mixture.

In the asphalt cement compositions that has the coarse agglomerates these coarse agglomerates have generally an agglomerate diameter size in the range of about 8 microns to about 70 microns, typically about 15 microns to about 45 microns, preferably about 20 microns to about 28 microns and in a preferred embodiment the size will be about 26 microns.

In the asphalt cement compositions that have the fine agglomerates, these fine agglomerates have a particle size range between about 10 nm to 35 nm; typically from about 15 nm to about 30 nm and preferably about 25 nm. The fine agglomerates mixture has a nitrogen surface area measured using two different techniques, the BET technique and the Iodine absorption technique. The fine agglomerates mixture has a nitrogen surface area determined using the BET technique of generally about 46 m$^2$/g to about 72 m$^2$/g and preferably about 58 m$^2$/g. The fine agglomerates mixture has a nitrogen surface area determined using the iodine absorption technique of about 53 mgI$_2$/g to about 254 mgI$_2$/g and preferably about 176 mgI$_2$/g.

In the asphalt cement compositions that have a mixture of fine agglomerates and coarse agglomerates, these compositions have a mixture of the above properties.

Example 2

This study's objective was to analyze the effect of using the agglomerates filler (hereafter called "CBp") on Hamburg Wheel Test Data (HWTD) results. In this study, HWTD was used to evaluate mixture properties for different levels of CBp modification. The CBp used in this research, which was light black in color, was provided by CBp Carbon Industries Inc. in the Netherlands. Binder used in this study was provided by Martin Asphalt located in Houston, Tex. The binder meets the requirements for PG 64-22. Table 4 summarizes the test results on the original binder used in this study.

TABLE 4

Superpave Binder Tests Results for PG 64-22

| PG 64-22 | | Test Results | Requirement |
|---|---|---|---|
| Original | G*/sinδ | 2.12 kPa | Minimum 1.00 kPa |
| RTFO | G*/sinδ | 4.24 kPa | Minimum 2.20 kPa |
| PAV | G*sinδ | 2560 kPa | Maximum 5000 kPa |
| PAV | S | 184 MPa | Maximum 300 MPa |
| PAV | m-value | 0.328 | Minimum 0.300 |

Four different CBp modification levels, 0%, 4%, 8% and 12%, were utilized for this study. TxDOT Type D mix was utilized for the study; the gradation for this mix and the TxDOT specifications are below in Table 5.

TABLE 5

Gradation for the TxDOT Type D mix used in this study

| Sieve Size | Cum. % Passing | Lower Spec. Limit | Upper Spec. Limit |
|---|---|---|---|
| 3/4" | 100.0 | 100.0 | 100.0 |
| 1/2" | 100.0 | 98.0 | 100.0 |
| 3/8" | 97.0 | 85.0 | 100.0 |
| No. 4 | 69.5 | 50.0 | 70.0 |
| No. 8 | 41.9 | 35.0 | 46.0 |
| No. 30 | 15.8 | 15.0 | 29.0 |
| No. 50 | 8.4 | 7.0 | 20.0 |
| No. 200 | 2.2 | 2.0 | 7.0 |

Two specimens for each modification level were prepared by the Superpave gyratory compactor. The specimens were tested at 55° C.

The HWTD was developed in the 1970s by Esso A.G. of Hamburg, Germany. This equipment measures the combined effects of rutting and moisture damage by rolling a steel wheel across the surface of an asphalt concrete slab that is immersed in hot water. Originally, only cubical-shaped specimens could be tested. The test now can be performed on both cubical and cylindrical specimens. The cubical specimens are approximately 320 mm long, 260 mm wide, and 40 mm thick. The cylindrical specimens are 150 to 300 mm in diameter and about 40 mm thick. The sample is typically compacted to 7±1 percent air voids. Use of cylindrical specimens makes it possible to obtain compacted specimens very easily with the aid of the Superpave gyratory compactor.

Traditionally, the HWTD tests have been performed at 50° C., even though the temperature can vary between 25° C. and 70° C. Approximately 6.5 hours are required for a test, but in many cases the samples have failed in a much shorter period of time. Specimens are tested in a submerged-in-water environment. The device operates two steel wheels simultaneously. Each wheel makes about fifty passes per minute, which applies 705±22 N force on the specimens. Two samples are required for each individual wheel. Since the device has two wheels, it can test four samples (two couples) at the same time and provides a single report for each couple.

The test results from the HWTD include post-compaction consolidation, creep slope, stripping slope, stripping inflection point, and final rut depth. The post-compaction consolidation is the deformation (mm) at about 1,000 wheel passes. It is called post-compaction consolidation because it is assumed that the wheel increases the density of the mixture within the first 1,000 wheel passes. The creep slope relates to rutting from plastic flow. It measures the accumulation of permanent deformation primarily owing to mechanisms other than moisture damage. The stripping slope is the inverse of the rate of deformation in the linear region of the deformation curve, after stripping begins and until the end of the test. This slope measures the accumulation of permanent deformation owing primarily to moisture damage. The stripping point is the number of passes at the intersection of the creep slope and the stripping slope. It is related to the resistance of the HMA to moisture damage. After this point, moisture damage starts to dominate performance. To report the creep slope and the stripping slope in terms of wheel passes, inverse slopes are used. Higher creep slopes, stripping inflection points, and stripping slopes indicate less damage.

Figure 7:
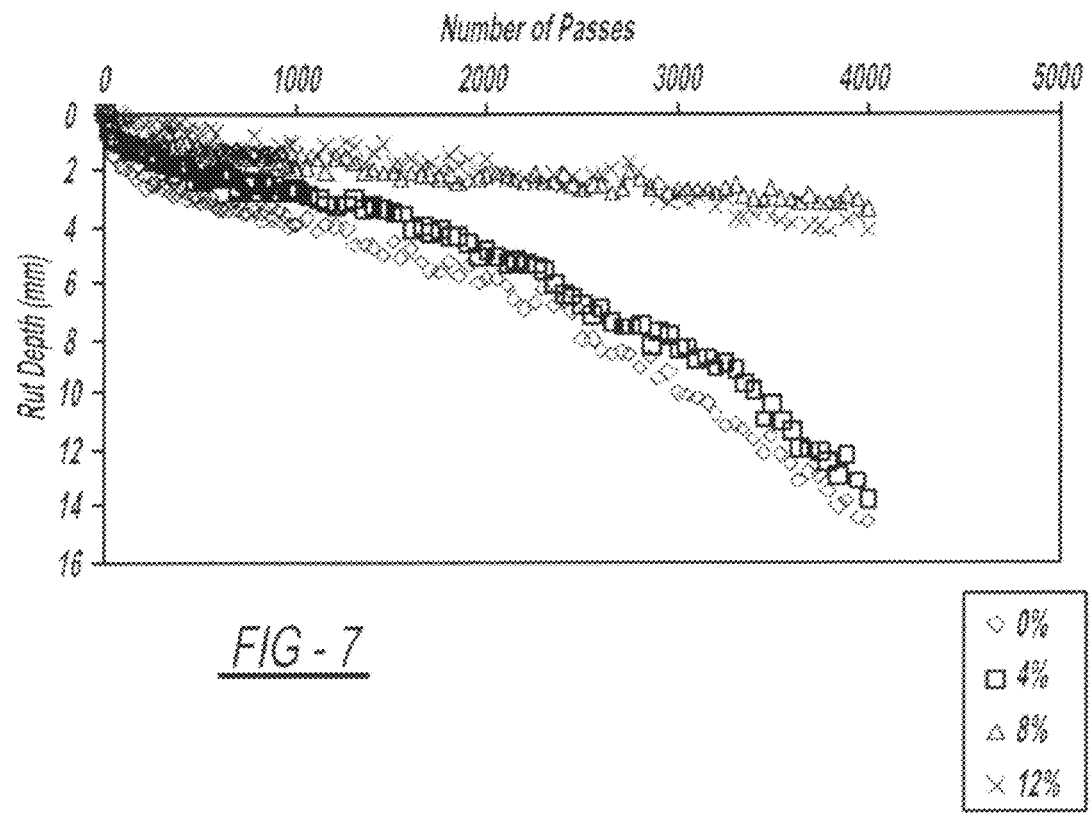
FIG. 7 is a graph illustrating the rut depth versus the number of passes for each of the CBp modification levels tested.
Figure 8:
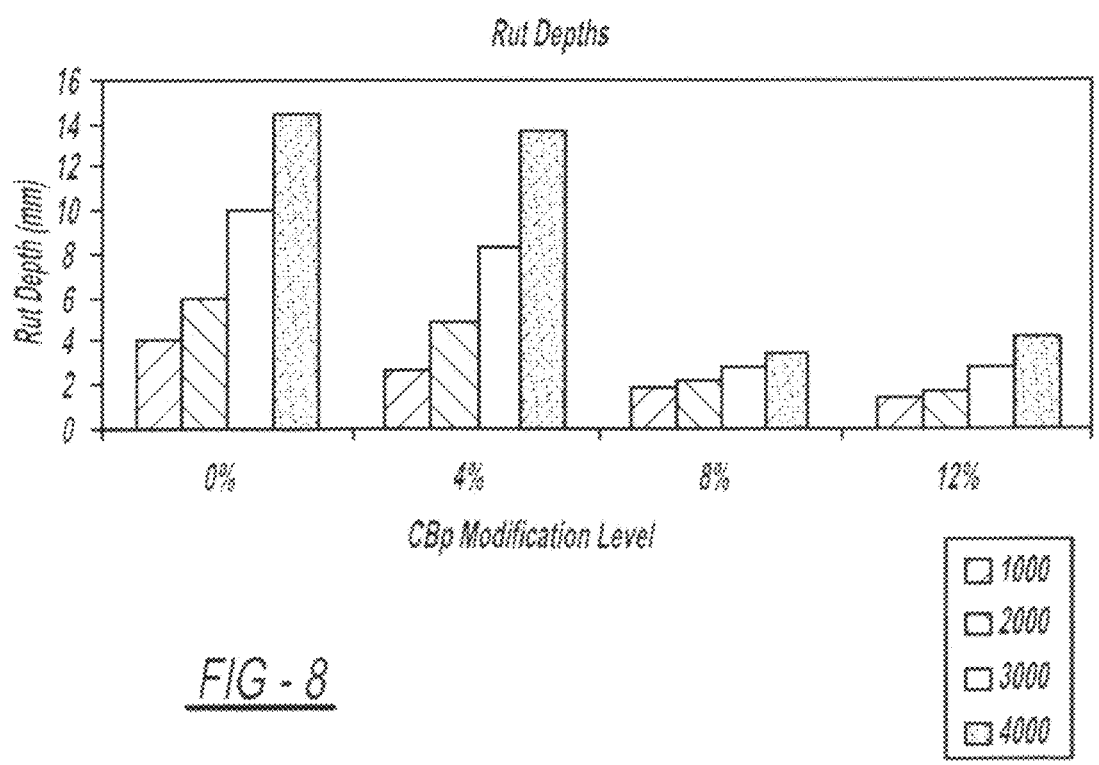
FIG. 8 is a bar graph illustrating the rut depth versus the CBp modification levels.
Figure 10A:
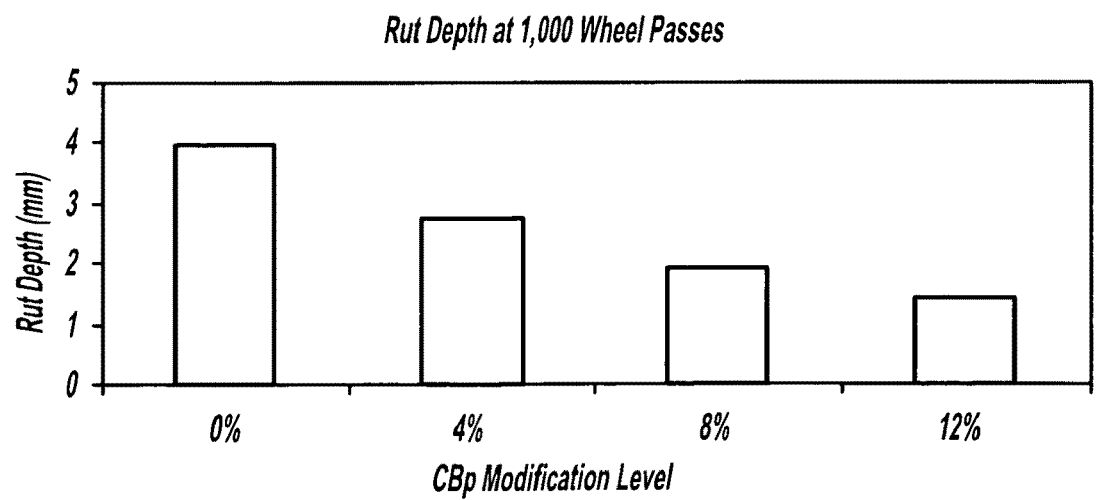
FIG. 10*a* is a bar graph of the rut depth versus the CBp modification level for 1,000 wheel passes.
Figure 10B:
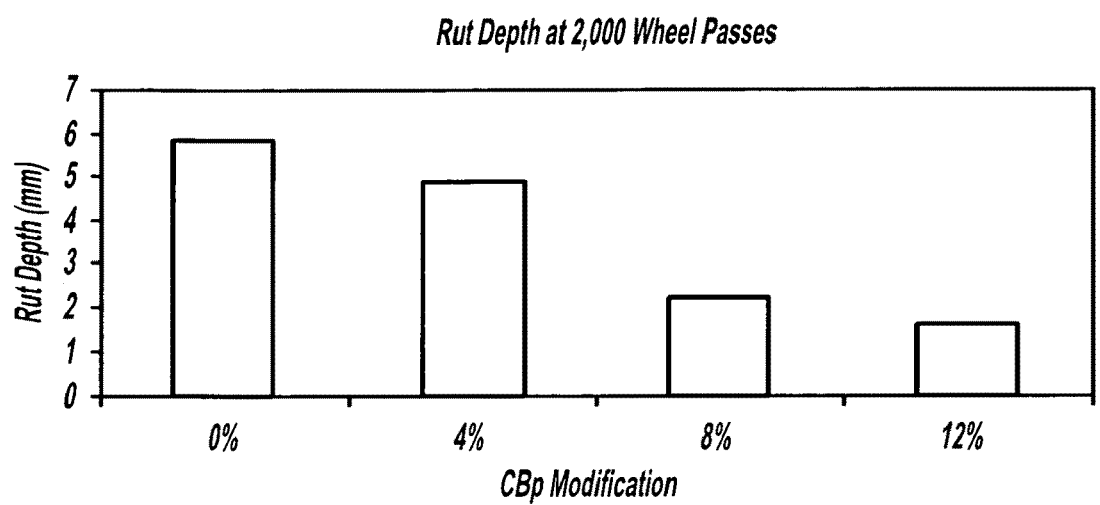
FIG. 10*b* is a bar graph of the rut depth versus the CBp modification level for 2,000 wheel passes.
Figure 10C:
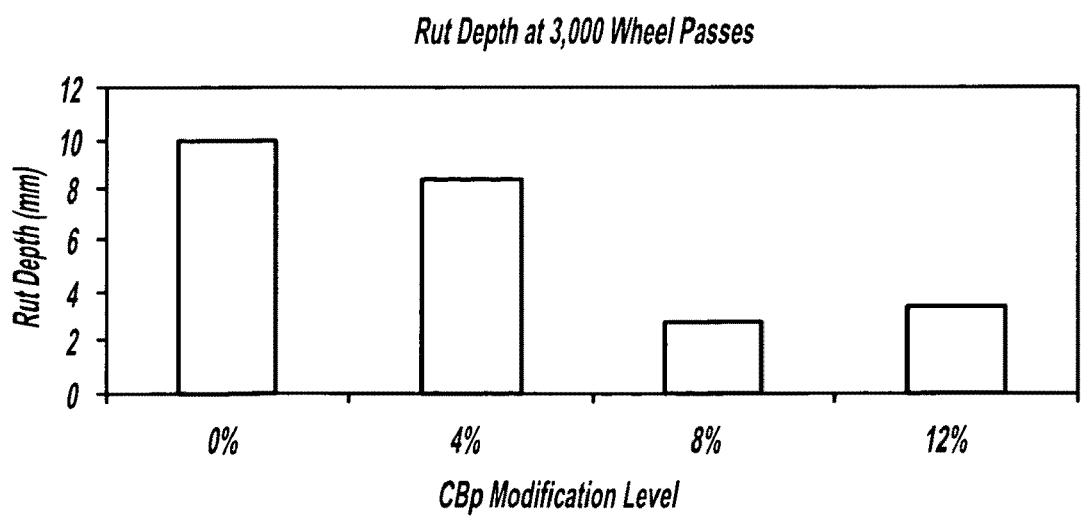
FIG. 10*c* is a bar graph of the rut depth versus the CBp modification level for 3,000 wheel passes.
Figure 10D:
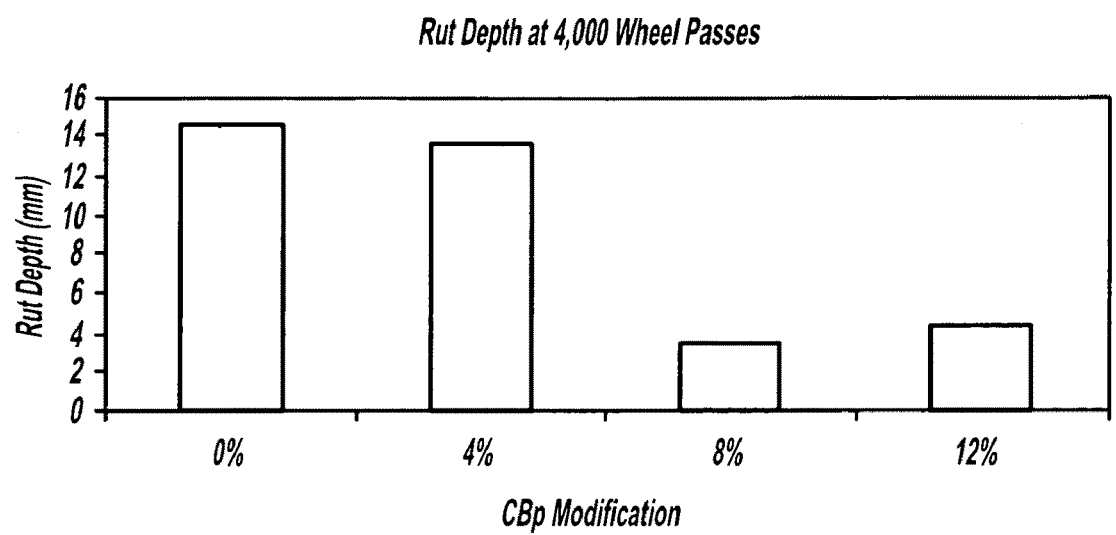
FIG. 10*d* is a bar graph of the rut depth versus the CBp modification level for 4,000 wheel passes.

In this study, all specimens were tested up to 4,000 wheel passes. FIG. 7 shows the HWTD data for each modification level. As can be seen by the provided graph, it should be noted that as increase in the CBp amount in the blend, provides rutting resistance to the mix. FIG. 10*a* shows the post compaction data for the specimens. This figure shows that the highest rut depth, 3.97 mm, is observed on the original binder and 2.75 mm is observed on the 4% CBp modified binder while at 8% and 12% CBp modification, 1.92 mm and 1.42 mm rut depths were observed respectively. The higher rut depth differences are observed at the 2,000 wheel passes, as can be seen in FIG. 10*b*. Similar trend is observed in FIGS. 10*c* and 10*d*. At 4,000 wheel passes in FIG. 10*d*, the 8% and 12% CBp modification again showed the best result. The highest rutting resistance gain is observed going from 4% to 8% CBp modification. The performance of 8% and 12% CBp modification are observed as similar. FIG. 8 summarizes the rutting levels at these wheel passes.

Figure 9:
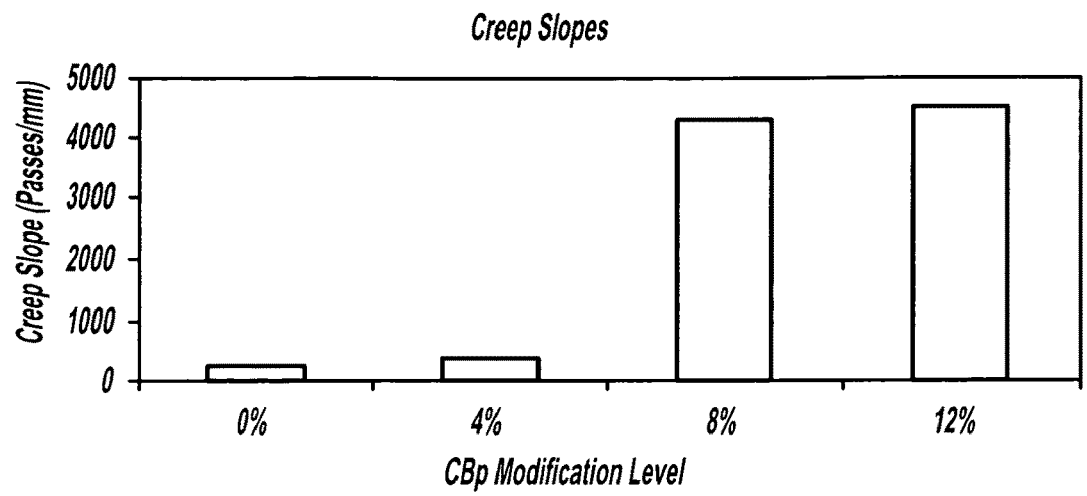
FIG. 9 is a bar graph illustrating the creep slope versus the CBp modification levels.

Creep slopes were calculated based on the data collected between 1,500 and 2,800 wheel passes. To report the creep slope in terms of wheel passes, inverse slopes are used. The higher creep slopes indicate less damage. The highest creep slope is observed for 12% CBp modification level at 4,499 wheel passes/mm and the lowest creep slope is observed for the original binder at 220 wheel passes/mm. As the CBp modification level increase, significant increase in the creep slope performance is observed. The highest increase is observed going from 4% to 8% modification level. The creep slope performance of 8% and 12% CBp modification levels were close to each other. FIG. 9 shows the creep slopes for four modification levels.

As can be seen in FIG. 7, the original and 4% CBp modified binders showed change in slope around 2,800 passes. For 8% and 12% CBp modification levels no obvious stripping inflection point or stripping slope is observed for these mixes before 4,000 wheel passes. Both the specimens prepared with the original and 4% CBp modified binders showed significant deformation, 14.5 mm and 13.7 mm respectively, at 4,000 wheel passes. 4% CBp modified binder showed better creep slope and striping inflection point values than the original binder.

The results of this study indicate that the 8% and 12% CBp modified specimens showed the best overall performance for rutting resistance at the HWTD test. Further, the 8% and 12% CBp modified specimens showed higher creep slope values and lower rutting values at each different number of wheel passes. Where specimens prepared with the original and 4% CBp modified binders showed stripping inflection point around 2,800 wheel passes, both 8% and 12% CBp modified binders did not show any obvious stripping inflection point before 4,000 wheel passes.

The analysis indicates that as the amount of CBp in the blend increases, the stiffness of the binder increases. The highest performance increase is observed going from 4% to 8% CBP modification. 8% and 12% CBp modified binders showed similar performances at HWTD. In this case study, only one binder type and one mixture type were used. This research found that as the CBp modification increased, the rutting resistance also increased with CBp modification. CBp modification also reduced the symptoms of moisture damage. Both 8% and 12% CBp modification showed better performance than the unmodified and 4% CBp modified binders in terms of moisture susceptibility. This case study should be repeated for different mixes and binders for a better performance analysis of the effect of CBp modification.

Additional information and examples of the materials used in accordance with the present invention can be found in the following applications: U.S. Patent application No. 60/986, 318 entitled "Process For Classifying Particles In A Pyrolysed Char," filed Nov. 8, 2007, application No. 60/986,369 entitled "Asphalt Composition Using Pyrolysed Carbonaceous Materials," filed Nov. 8, 2007, and application No. 60/986,126 entitled "Enhanced Fine Agglomerate Mixture," filed Nov. 7, 2007, wherein the entirety of each application is hereby incorporated by reference.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An asphalt cement composition comprising:
   an asphalt binder;
   an agglomerates filler formed from pyrolized carbonaceous material, said agglomerates filler present in a range between about 1% to about 20% by weight of said asphalt binder mixed with said agglomerates filler, and having an inorganic functional filler in a range between about 5% to about 20% weight of said agglomerates filler, wherein said agglomerates filler has a nitrogen surface area greater than or equal to 53 $mgI_2/g$ measured by iodine absorption; and
   an aggregate material.

2. The asphalt cement composition of claim 1, wherein said pyrolized polymeric materials consist essentially of scrap tires.

3. The asphalt cement composition of claim 1, wherein said pyrolized polymeric materials consist essentially of used polymeric automotive components.

4. The asphalt cement composition of claim 1, wherein said pyrolized polymeric materials consist essentially of recyclable polymeric materials.

5. The asphalt cement composition of claim 1 wherein said agglomerates filler has a nitrogen surface area greater than or equal to 46 $m^2/g$.

6. The asphalt cement composition of claim 1 wherein said aggregate is one selected from the group consisting of sand, gravel, crushed stone, slag, recycled concrete, minerals, limestone, clay, and combinations thereof.

7. The asphalt cement composition of claim 1 wherein said asphalt binder is one selected from the group consisting of AC-10, AC-20, PG64-22, and combinations thereof.

8. The asphalt cement composition of claim 1 wherein said agglomerates filler are fine agglomerate particles having an average particle size of less than or equal to 35 nm.

9. The asphalt cement composition of claim 1 wherein said agglomerates filler are coarse agglomerate particles having an average particle size range of about 8 microns to about 70 microns.

10. An asphalt cement composition comprising:
an asphalt binder;
an agglomerates filler formed from pyrolysis of polymeric materials having a carbon content in a range substantially between about 80% to about 95% by weight of said agglomerates filler and an inorganic functional filler in a range between about 5% to about 20% weight of said agglomerates filler, wherein said agglomerates filler has a nitrogen surface area greater than or equal to 53 $mqI_2/q$ measured by iodine absorption; and
an aggregate material.

11. The asphalt cement composition of claim 10, wherein said agglomerates filler are fine agglomerate particles having an average particle size of less than or equal to 35 nm.

12. The asphalt cement composition of claim 10, wherein said agglomerates filler has a nitrogen surface area greater than or equal to 73 $m^2/g$.

13. The asphalt cement composition of claim 10, wherein said polymeric materials consist essentially of scrap tires.

14. The asphalt cement composition of claim 10, wherein said polymeric materials consist essentially of used polymeric automotive components.

15. The asphalt cement composition of claim 10, wherein the polymeric materials consist essentially of recyclable polymeric materials.

16. The asphalt cement composition of claim 10 wherein said aggregate is one selected from the group consisting of sand, gravel, crushed stone, slag, recycled concrete, minerals, limestone, clay, and combinations thereof.

17. The asphalt cement composition of claim 10 wherein said asphalt binder is one selected from the group consisting of AC-10, AC-20, PG64-22, and combinations thereof.

18. The asphalt cement composition of claim 10 wherein said agglomerates filler is about 1% to about 20% by weight of the mixture of the asphalt binder and said agglomerates filler when mixed together.

19. The asphalt cement composition of claim 10 wherein said agglomerates filler are coarse agglomerate particles having an average particle size range of about 8 microns to about 70 microns.

20. An asphalt cement composition comprising:
an asphalt binder;
agglomerates filler formed from pyrolysis of scrap tires, an inorganic functional filler in a range between about 5% to about 20% weight of said asphalt cement composition and said asphalt cement composition having a nitrogen surface area greater than or equal to 73 $m^2/g$ and a nitrogen surface area of greater 53 $mgI_2/g$ measured by iodine absorption; and
an aggregate material.

21. The asphalt cement composition of claim 20, wherein said agglomerates filler is between about 80% to about 95% carbon by weight.

22. The asphalt cement composition of claim 20 wherein said aggregate is one selected from the group consisting of sand, gravel, crushed stone, slag, recycled concrete, minerals, limestone, clay, and combinations thereof.

23. The asphalt cement composition of claim 20 wherein said asphalt binder is one selected from the group consisting of AC-10, AC-20, PG64-22, and combinations thereof.

24. The asphalt cement composition of claim 20 wherein said agglomerates filler are fine agglomerate particles having an average particle size of less than or equal to 35 nm.

25. The asphalt cement composition of claim 20 wherein said agglomerates filler are coarse agglomerate particles having an average particle size range between about 8 microns to about 70 microns.

26. The asphalt cement composition of claim 20 wherein said agglomerates filler is about 1% to about 20% by weight of the mixture of the asphalt binder and said agglomerates filler when mixed together.

* * * * *